Oct. 19, 1937.  R. T. HOSKING  2,096,041

LOCK NUT

Filed Dec. 26, 1935

INVENTOR
RICHARD T. HOSKING
BY
George B. Willcox
ATTORNEY

Patented Oct. 19, 1937

2,096,041

UNITED STATES PATENT OFFICE 2,096,041

LOCK NUT

Richard T. Hosking, Wilmette, Ill.

Application December 26, 1935, Serial No. 56,178

9 Claims. (Cl. 151—37)

This invention relates to improvements in locking devices for nuts, set screws or the like which are termed rotatable screw-threaded members, characterized by having on the face of the nut a series of tool-like elements that operate, while the nut is being screwed down tight, to build up rib-like barriers on the face of the work piece. The function of the barriers thus created on the work piece is to co-operate with the tool-elements on the nut to prevent the nut from loosening in use.

Correct appreciation of the objects and unique advantages of my improvement over known devices of such character requires a brief statement of some of the working conditions under which a lock-nut of this kind may be required to function.

Nuts which are standard in automotive practice have walls so thin that undue pulling stress brought on the bolt in use tends to imbed the face of the nut into the work, soon resulting in loose connections and squeaks.

Under such circumstances the greatest possible amount of effective bearing area for the face of the nut should be presented by the rib-like barriers that are generated on the work face by the rotation of the nut. The barriers should be arranged and shaped so that they can not be crushed, flattened or undesirably distorted by any pressure which the nut may exert upon them.

Sometimes in attaching fish plates to rail joints it becomes necessary to tighten the threaded nut as much as six complete turns after the first thousand pounds pressure on the face of the nut has been reached. Likewise, in fastening a bumper on a motor car, that part of the bumper which comes in contact with the chassis is not usually quite parallel with the chassis and must be drawn up by the threaded nut until it is parallel and tight, frequently requiring several turns of the nut after it comes into locking engagement with the work piece. Abrupt teeth of the kind above referred to, if given extra turns, merely cut circular grooves in the work and practically destroy the locking effect.

A lock-nut, therefore, to be satisfactory must be capable of making extra turns under heavy stress without damaging the face of the work piece or injuring the locking barriers or wales that were formed by preceding turns of the nut. That desirable result also is attained by my improvement.

In an earlier filed co-pending application, Serial No. 5,886, I have disclosed and claimed a structure that satisfies the requirements alluded to above. In the present case there are introduced, in addition, certain features whereby the effectiveness of the device is improved. The features referred to relate to the arrangement and mode of operation of certain channels which are formed in the face of the threaded element.

The advantages of this improvement arise from the co-operation of the new grooves or channels with the earlier described tool-like elements or ridges on the nut. Such co-operation has the following advantageous results: The faces of the nut and work piece can be brought into complete contact because the wales raised up from the face of the work piece are received in the channels of the nut, thereby distinguishing from my earlier structure. The bearing value of the entire area of the face of the nut is thereby utilized for stronger holding of the bolted joint. The ridges or tool-like elements on the nut sink into the face of the work piece as before, but in addition, the wales raised up from the work piece are received into the channels in the nut, giving a double interlocking effect when the nut is completely tightened, and also, to a lesser extent while the nut is being screwed down. The channels in the nut shape and mold or wipe the wales into firm, solid, arcuate ribs and diagonal locking elements that are preserved intact during repeated turnings of the nut, instead of cutting channels in the work piece and destroying the desired locking effect, if the nut is removed after having been used and is again replaced. Some such destruction of the locking function has been inherent in all of the earlier devices known to me prior to my invention.

With the foregoing and certain other objects in view, which will appear later in the specification, my invention comprises the devices described and claimed and the equivalents thereof.

The invention will be illustrated and described as being applied to the face of a threaded nut, and in an alternative form to the end of a threaded screw. Yet it is applicable to any other rotatable threaded body, such as a screw head, or a bolt whose end face is perpendicular to its axis of rotation. The term "nut" will be understood to designate all such alternative embodiments of the claimed invention.

In the accompanying drawing like reference characters designate like parts in the several views.

Figure 1:
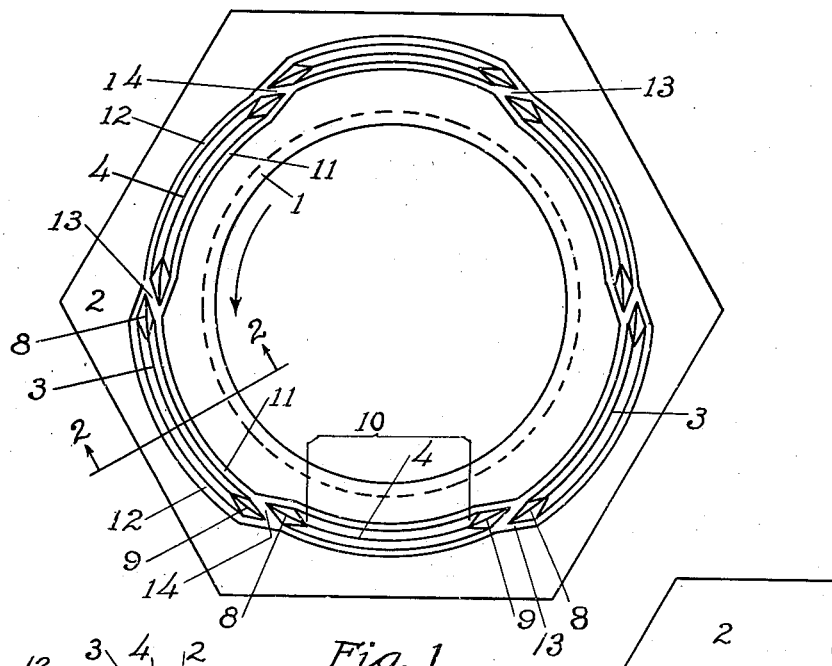
Fig. 1 is a face view of a nut embodying my improvement in a preferred form.
Figure 2:
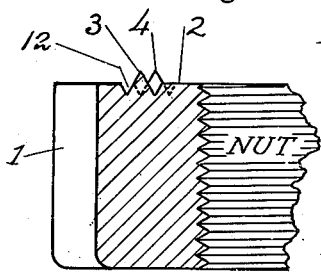
Fig. 2 is a sectional view on line 2—2 of Fig. 1.

Referring to Figs. 1 and 2, a threaded member, such as a nut 1, a set screw or a bolt head, is provided on its flat work-engaging face, 2, with one or more outwardly projecting ridges 3, 4. The ridges are of hardened metal, and preferably their outer edges are sharp enough to readily penetrate the face of a metal work piece. Each ridge has the form of a circular arc concentric with the member 1, and in cross section is arris-shaped. The peripherally alternate ridges 3, 4 conform respectively to larger and smaller circles whose diameters differ by the width of a ridge.

Figure 5:
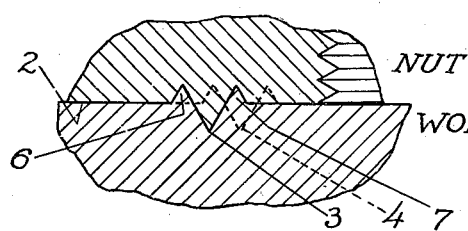
Fig. 5 is an enlarged sectional detail of the interengaged ridges on the face of the nut and the wales on the face of the work piece.
Figure 4:
Fig. 4 is a sectional view on line 4—4 of Fig. 3.

The function of the ridge is to imbed itself in the work piece when the nut is rotated and screwed into face-to-face engagement with the work piece, as shown in Fig. 5.

Figure 6:
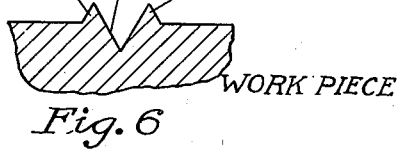
Fig. 6 is a detached diagrammatic view showing how the metal at the face of a work piece, such as the one shown in Fig. 5, is displaced, forming a groove and two wales.

While the nut is being screwed down, the ridges 3, 4, by their combined rotary and downward movement, begin to create grooves 5, Fig. 6, in the face of the work piece, and they also raise up wales 6, 7, alongside the grooves 5 by their downward thrust and displacing action. While the nut continues to be rotated the ridges 3, 4, continuing their circular travel penetrate deeper into the face of the work, and the wales 6, 7 increase in size. This augments the area of effective bearing surface which the nut, 1, has upon the work piece.

Figure 3:
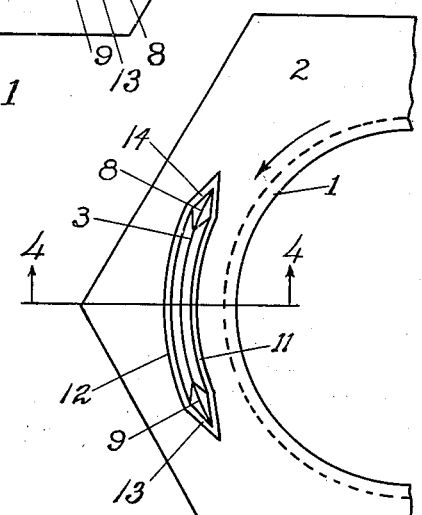
Fig. 3 is a fragmentary face view of a nut embodying the improvement in a modified elemental form.

The end portions of each ridge 3, 4, are preferably shaped to present oppositely directed tapered ends, 8, 9, as shown in Figs. 1 and 3, so as to facilitate embedding the ridges into the work. The tapered ends also guide the wales, without any tearing or harmful distortion, into transverse locking positions, as will be explained later.

The part 10 of the ridge 3, 4, intermediate the tapered ends 8, 9, defines a circular arc concentric with the nut, and the tapered ends likewise are concentric. The intermediate portion 10 of the ridge is preferably uniform in height throughout its length.

In a preferred form of my invention, Fig. 1, the ridges constituting a given row, as 4, 4, are spaced apart endwise. The ridges 3, 3 of an adjacent row, substantially span the spaces that exist between the said ridges 4, 4 of the first mentioned row. More than two rows of ridges 3, 4, may be employed. Such an arrangement is disclosed in my companion application previously referred to.

In the structures shown in the accompanying drawing, the base or face 2 of the nut 1 is formed with arcuate concentric inner channels 11, 11, and outer channels 12, that extend along both sides of and are coextensive with the bases of the ridges 3, 4. Also, as shown in Fig. 1, diagonal channels or elements 13, 14, formed in the face 2, extend between and separate the adjacent ends 8, 9 of successive ridges 3, 4, while connecting inner channels 11 with outer channels 12. The function of channels 13, 14 is to direct the flow of shifting metal in what may be described as a gentle curve while being diverted by each ridge in succession as the nut rotates to its clamping position. The arcuate channels 11, 12 and the diagonal channels 13, 14 are arranged and adapted to receive within themselves the wales 6, 7, Fig. 6, that are created by being forced up from the face of the work piece as a result of the imbedding, plowing, metal displacing action of the nut ridges 3 and 4.

In operation, the function of the arris-shaped channels 11, 12 is to confine the metal as it rises up on the face of the work piece and shape it into elongated arcuate wales that are thus made into long unbroken metal ribs 6, 7, concentric with the axis of the nut, bolt head or like threaded member, as is shown in Fig. 6. Those portions of the wales that are embraced by the diagonal channels 13, 14 in the nut shown in Fig. 1 constitute nut locking elements. They lie directly across the path of the ridges 3, 4 when the nut tends to turn or is forced to turn in reverse direction. By such locking elements the nut is prevented from unscrewing under the conditions of use.

More specifically, the action may be described as follows:

When the nut is completely screwed down the wales raised up from the face of the work fill the channels 11, 12. These channels remain filled, even when the nut continues to be turned in the tightening direction, as for example, when bolting a bumper to a chassis frame. Therefore, the channels in the nut form interlocking tracks or ways for the wales.

It will be observed that if the channels in the nut were truly circular there would be merely a circular movement between the wales and the walls of the channels between which the wales are confined; but the channels are provided with the portions 13, 14, so that continued rotation of the nut progressively moves a portion of the wales radially inward and outward. This radial or offsetting movement is due to the fact that the wales are constrained within the channels and are guided by them in the manner indicated at 13, 14.

Thus there is provided a locking effect that prevents retrograde movement at all stages of tightening. The channels define a linearly continuous path or groove all the way around the nut somewhat serpentine, but generally speaking, circular in form.

It is now apparent that there is a cooperative and double-interlocking action between the nut and the work. That is, the ridges 3, 4 of the nut become embedded in the grooves of the work; the wales 6, 7 raised up from the work piece are received in the channels 11, 12 and also in the diagonal channels 13, 14. It is also evident that the wales in the diagonal channels 13, 14 extend, like solid metal dykes, clear across the rearward ends of the respective ridges 3, 4, and present solid locking abutments directly in the rear of said ridges.

Not only is this novel double interlocking effect present when the nut is completely tightened down upon the work piece, as in Fig. 5, but also during all earlier stages of tightening. That is, adequate locking effect is present regardless of the number of turns that may have been made by the nut in tightening.

In Fig. 3 there is shown, for purpose of better illustration of the principle and mode of operation of the displacement and interlocking features of my invention, a single arris 3 with tapered ends 8, 9, and arcuate channels 11, 12, with diagonal channels 13, 14, at the ends of the arrises.

In both forms illustrated the grooves are of sufficient capacity to receive all or substantially

Having thus described my invention, what I claim and desire to secure by Letters Patent is:

1. A threaded member having outwardly projecting ridges on its work-engaging face, each ridge forming a circular arc, co-axial with said member, said ridges being spaced apart endwise in a circular row; there being a plurality of concentric radially offset circular rows, the individual ridges in each row substantially spanning the spaces between the ridges of an adjacent row, arcuate grooves in the work-engaging face of said threaded member, said grooves extending along the bases of said ridges on both sides thereof; diagonal channels in said face located between adjacent ends of successive ridges and connecting said grooves; the said arcuate grooves and diagonal channels being arranged and adapted to receive within themselves wales raised on the face of a work piece by the metal-displacing action of said ridges, when said threaded member is rotated to screw it into face-to-face engagement with said work piece, and to shape said wales into solid arcuate ribs and diagonal locking elements, for the purposes set forth.

2. A threaded member having a ridge of substantially uniform height projecting beyond the plane of its work-engaging face and of arris-like cross-sectional shape; the portion of said ridge intermediate its ends defining an arc of a circle concentric with said threaded member and having oppositely directed tapered ends; the face of said threaded member formed with a channel adjacent each side of said ridge and along the tapered ends thereof, the size of said channels being appropriate to contain the material displaced by said ridge when the threaded member is screwed into locking engagement with a work piece.

3. A threaded member having a work-engaging face, a ridge of arris-like cross section projecting therefrom, the portion of the ridge intermediate its ends defining an arc of a circle concentric with said threaded member, the extremities of said ridge presenting oppositely directed tapered ends; concentric channels formed in said member along the sides of said ridge adjacent the base thereof; said channels being of appropriate size to contain the material displaced by said ridge when the threaded member is screwed into locking engagement with a work piece.

4. A threaded member having ridges of arris-like cross-sectional shape projecting beyond the plane of its work-engaging face and spaced apart lengthwise to present two concentric circular rows, the ridges comprising the outer row being disposed in staggered relation to those of the inner alinement with two ridges and occupying the row; the face of said threaded member being formed with channels at the bases of said ridges and coextensive therewith, said channels being of appropriate size to contain the material displaced by said ridges when the threaded member is screwed into locking engagement with a work piece; and diagonally disposed channels connecting said first mentioned channels between adjacent ends of the ridges.

5. A rotary threaded member having a clamping face, arris-like ridges projecting from said face, each ridge defining a circular arc concentric with said threaded body, peripherally alternate ridges conforming respectively to larger and smaller circles whose diameters differ by the width of a ridge; channels in said clamping face at both sides of each ridge and coextensive therewith, there being one such channel in peripheral alinement with two ridges and occupying the circumferential space between the ends thereof.

6. A rotary threaded body having a clamping face, an approximately circular series of outstanding V-shaped arcuate ridges on the clamping face concentric with said body, certain of said ridges conforming to a larger circle than other alternate ridges, said ridges being adapted to sink into the surface of a work piece when the said threaded body is tightened thereagainst and adapted by displacing and shifting the metal of said surface to create protruding wales at the sides of said ridges; channels in the clamping surface of the threaded body along the base of said ridges, said channels being of appropriate dimensions to receive the said wales and thereby permit adequate clamping engagement of the faces of said rotary body and work piece; elements angularly arranged intermediate the ends of said ridges adapted to direct a portion of the metal constituting a wale diagonally to a point rearward of a ridge during the rotation of the threaded body toward its tightened position, whereby to establish a locking abutment in the rear of said ridge and to maintain the same during such rotation.

7. A rotatable threaded member having a work-engaging face, and an element of arris-like cross section projecting beyond said face, the extremities of said element presenting oppositely directed tapered ends; channels formed in said face and having portions extending diagonally and along said tapered ends at both sides thereof, said channels being of appropriate size to contain the material displaced by said element when the said threaded member is screwed into locking engagement with a work piece.

8. A threaded member having an outwardly projecting ridge on its work-engaging face defining a circular arc co-axial with said member, and having a tapered end portion, arcuate grooves in said face extending along the base of said ridge on both sides thereof, and diagonal channels in the face of said member alongside the base of said tapered end portion and connecting with said grooves.

9. A threaded nut having on its work-engaging face elongated arcuate ridges and concentric coextensive ridges being offset laterally in relation to each other, the advancing end of each arris being tapered to present a forwardly directed cutting point, the rearward end having a similar tapered point rearwardly directed, the intermediate portion of each arris being substantially V-shaped in cross section and of substantially uniform height throughout its length; adjacent ends of coextensive arrises being spaced apart circumferentially and laterally to present a transverse channel disposed diagonally between said ends, and a channel in the face of the nut at the base of each arris, connecting with said diagonal channel.

RICHARD T. HOSKING.

CERTIFICATE OF CORRECTION.

Patent No. 2,096,041.  October 19, 1937.

RICHARD T. HOSKING.

It is hereby certified that error appears in the printed specification of the above numbered patent requiring correction as follows: Page 3, first column, line 57, claim 4, strike out the words "alinement with two ridges and occupying the"; and that the said Letters Patent should be read with this correction therein that the same may conform to the record of the case in the Patent Office.

Signed and sealed this 1st day of February, A. D. 1938.

Henry Van Arsdale,
Acting Commissioner of Patents.

(Seal)